(12) United States Patent
Goldstein

(10) Patent No.: US 11,190,066 B2
(45) Date of Patent: Nov. 30, 2021

(54) ROTOR LAMINATION WITH KEY

(71) Applicant: Ford Global Technologies, LLC, Dearborn, MI (US)

(72) Inventor: Cyrille Goldstein, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 94 days.

(21) Appl. No.: 16/261,417

(22) Filed: Jan. 29, 2019

(65) Prior Publication Data

US 2020/0244117 A1  Jul. 30, 2020

(51) Int. Cl.
| | |
|---|---|
| *H02K 1/32* | (2006.01) |
| *H02K 1/27* | (2006.01) |
| *H02K 29/03* | (2006.01) |
| *B60K 6/26* | (2007.10) |
| *B60K 6/36* | (2007.10) |
| *B60K 6/40* | (2007.10) |

(52) U.S. Cl.
CPC ............. *H02K 1/276* (2013.01); *H02K 1/32* (2013.01); *B60K 6/26* (2013.01); *B60K 6/36* (2013.01); *B60K 6/40* (2013.01); *B60Y 2200/92* (2013.01); *B60Y 2306/05* (2013.01); *B60Y 2400/60* (2013.01); *H02K 29/03* (2013.01)

(58) Field of Classification Search
CPC .......... H02K 1/00; H02K 1/27; H02K 1/2706; H02K 1/271; H02K 1/2713; H02K 1/276; H02K 1/2766; H02K 1/278; H02K 1/28; H02K 1/32; H02K 21/14; H02K 21/16; H02K 15/00; H02K 15/0018; H02K 15/03; B60L 50/16; B60L 50/51; B60L 50/62; B60L 1/00; B60L 1/003; B60L 1/0061; B60L 1/02; B60L 15/2009; B60L 7/14; B60L 3/0061; B60L 50/61
See application file for complete search history.

(56) References Cited

U.S. PATENT DOCUMENTS

| | | | |
|---|---|---|---|
| 9,225,211 B2 | 12/2015 | Naito et al. | |
| 2008/0224558 A1* | 9/2008 | Ionel | H02K 1/2766 310/156.57 |
| 2012/0222289 A1* | 9/2012 | Nagai | H02K 1/276 29/598 |
| 2013/0043761 A1* | 2/2013 | Kaimori | F16D 1/0876 310/216.123 |
| 2013/0293057 A1* | 11/2013 | Naito | H02K 1/28 310/216.123 |
| 2014/0232232 A1* | 8/2014 | Yamaguchi | H02K 1/2766 310/156.53 |
| 2017/0264153 A1 | 9/2017 | Groschup et al. | |
| 2018/0054101 A1* | 2/2018 | Desai | H02K 1/278 |

FOREIGN PATENT DOCUMENTS

| | | |
|---|---|---|
| GB | 674099 | 6/1952 |
| JP | 201372673 A2 | 4/2013 |

* cited by examiner

*Primary Examiner* — Tran N Nguyen
(74) *Attorney, Agent, or Firm* — David B. Kelley; Brooks Kushman P.C.

(57) ABSTRACT

The rotor of a permanent magnet motor includes a stack of laminations. Each lamination is located with respect to a shaft using a key with a tangential fillet. Each lamination also includes a set of lightening holes having a shape designed to minimize hoop stresses and thereby increase the maximum permissible operating speed of the motor. Furthermore, the tightening holes are aligned with the key to minimize interactions of the respective stress concentrations.

17 Claims, 4 Drawing Sheets

ROTOR LAMINATION WITH KEY

TECHNICAL FIELD

This disclosure relates to the field of permanent magnet motor design. More particularly, the disclosure pertains to a lamination suitable for fixation to a shaft having a keyway.

BACKGROUND

The demand for increased vehicle fuel economy has resulted in the electrification of automotive powertrains. Some powertrains are completely electric while other powertrains, called hybrid powertrains, utilize an internal combustion engine supplemented with electrical power. Permanent magnet Synchronous motors are commonly used due to their efficiency. The rotors of these electric machines are commonly formed by stacking a number of thin laminations.

As the rotor of an electric machine rotates, stresses occur in the laminations. Some of the stresses are the result of the generation of torque, but other stresses are caused by the rotation itself. These stresses may limit the allowable rotational speed. That, in turn, limits gearing ratios and maximum wheel torque. Therefore, lamination designs that are less susceptible to speed induced stress are desirable.

SUMMARY OF THE DISCLOSURE

A permanent magnet rotor lamination includes a body and a key. The body defines a plurality of magnet holes, a first plurality of lightening holes, and a second plurality of lightening holes interspersed with the first plurality of lightening holes. The second plurality of lightening holes may be smaller in area than the first plurality of lightening holes. The magnet holes may be grouped into a plurality of V-shaped groups, each group corresponding to a rotor pole, and each group radially aligned with a corresponding lightening hole of the first plurality of lightening holes. The body may further define a plurality of cooling holes interspersed with the groups of magnet holes. Each of the first plurality of lightening holes is bounded by an inner edge, two side edges at obtuse angles from the inner edge, and an outer edge. Each of the first plurality of lightening holes extends from a minimum distance from a laminate center to a maximum distance from the laminate center. Each of the side edges include a point that is a first distance away from a laminate center equal to an average of the minimum distance and the maximum distance. The key is radially aligned with one of the first plurality of lightening holes. The key may be slightly offset from a center of the inner edge of the lightening hole. The rotor laminations may further define a tangential fillet between the key and an inner periphery.

A rotor includes a plurality of rotor laminations as described above and a plurality of permanent magnet inserted into the magnet holes. A permanent magnet motor includes a plurality of rotor laminations as described above and a plurality of permanent magnet inserted into the magnet holes.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
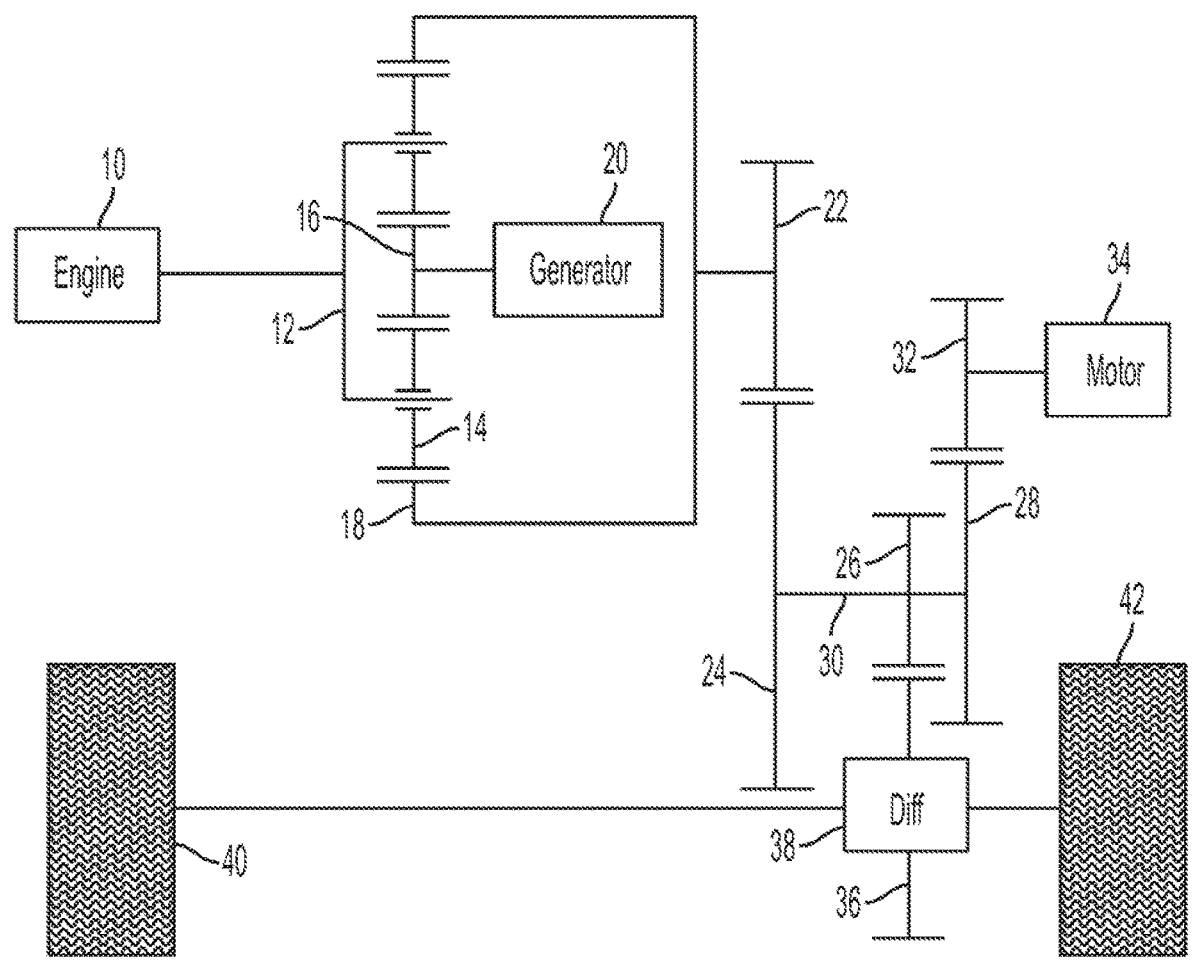
FIG. 1 is a schematic diagram of a powersplit hybrid transmission.

FIG. 1 illustrates a powersplit hybrid powertrain. Power is provided by engine 10. The crankshaft of engine 10 drives planetary gearset carrier 12. A set of planet gears 14 are supported for rotation with respect to carrier 12 and mesh with planetary sun gear 16 and planetary ring gear 18. Sun gear 16 is fixedly coupled to the rotor shaft of generator 20. Ring gear 18 is fixedly coupled to gear 22 which meshes with gear 24. Gears 24, 26, and 28 are all fixedly coupled to intermediate shaft 30. Gear 32 meshes with gear 28 and is fixedly coupled to the rotor shaft of motor 34. Gear 26 meshes with gear 36 which drives the input of differential 38. Differential 38 divides the torque between wheels 40 and 42, allowing slight speed differences between the wheels.

Generator 20 and motor 34 are both reversible electric machines. Each are electrically connected to respective inverters which, in turn, are electrically connected to a Direct Current (DC) bus. The DC bus is also connected to a battery. When generator 20 or motor 34 generate torque in the same direction as rotor rotation, electrical power is drawn from the DC bus. Conversely, when generator 20 or motor 34 generate torque in the opposite direction as rotor rotation, electrical power is supplied the DC bus. In some operating modes, the quantity of electrical power generated by one of the electrical machines is equal to the quantity of electrical power used by the other electrical machine such that no power is drawn from or stored in the battery. In other operating modes, power may be drawn from or supplied to the battery.

Figure 2:
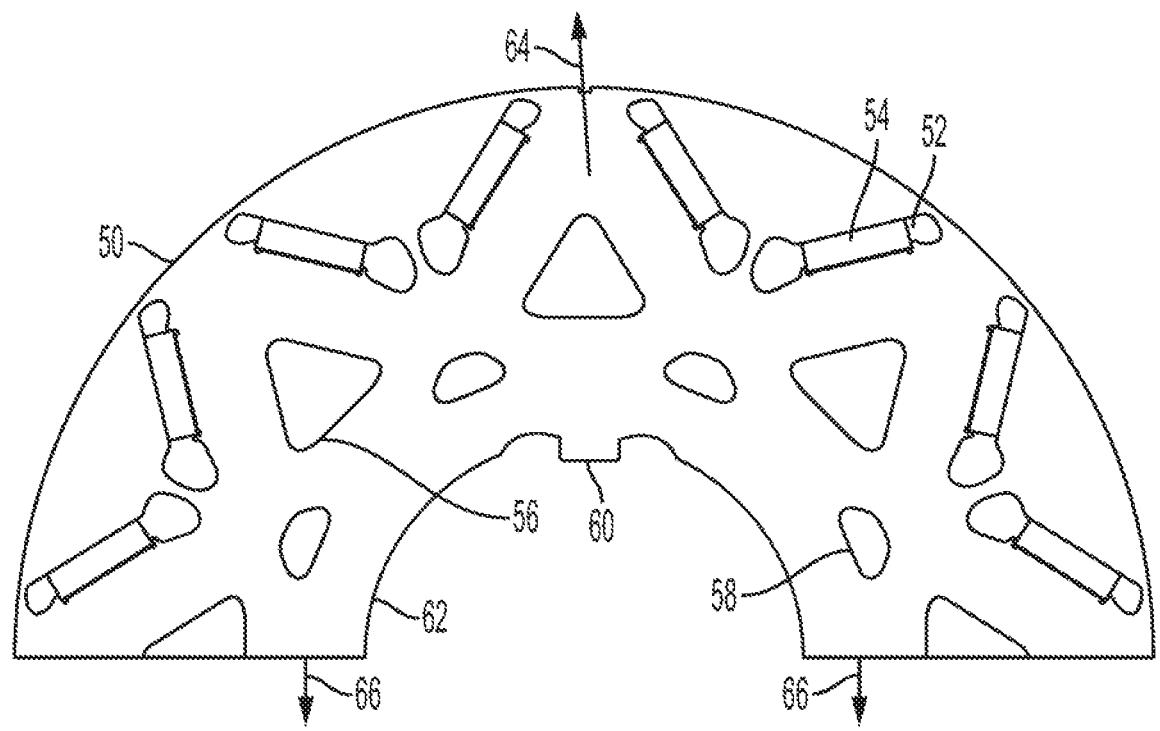
FIG. 2 is a partial cross section of a first motor rotor lamination.

Generator 20 and motor 34 are both permanent magnet synchronous Alternating Current (AC) electric machines. The rotors of each machine are formed from layers of laminations fixed to a rotor shaft, into which a number of permanent magnets are inserted. FIG. 2 illustrates half of an exemplary rotor lamination 50. A number of magnet holes 52 are located near the periphery. The magnet holes 52 may be arranged into V-shaped groups that create a rotor pole after magnets 54 are inserted. A series of cooling holes 56 may be located between the V-shaped groups. These holes form cooling channels in the laminate stack through which fluid is circulated to extract heat from the rotor. Additionally, the laminations may include lightening holes 58 to reduce the weight and moment of inertia of the rotor. A key 60 protrudes from an inner periphery 62 of the lamination. The key 60 fits into a keyway formed in the rotor shaft and serves to align laminations of the lamination stack with respect to one another. The key 60 may be circumferentially centered between V-shaped groups of magnet holes to ensure that the magnet holes of all laminations are aligned with one another. Alternatively, the key may be intentionally slightly offset such that the magnets of some layers are slightly offset from the magnets of other layers to reduce torque ripple.

Figure 3:
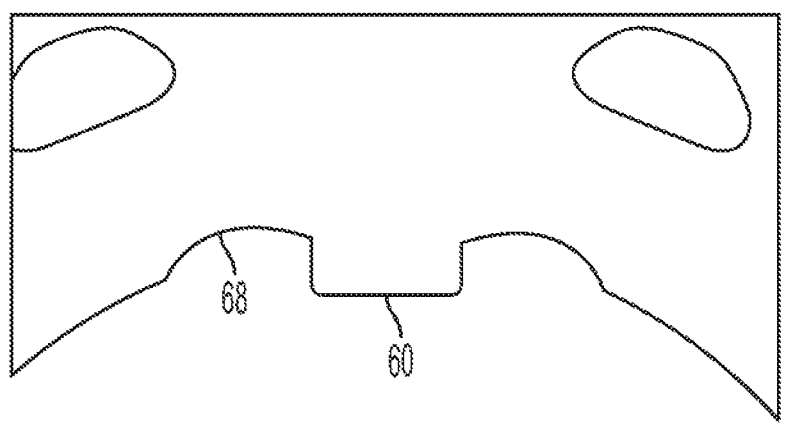
FIG. 3 is a detail view of the key of the motor rotor lamination of FIG. 2.

When the rotor rotates, the mass of the rotor itself results in circumferential stress, which may be called hoop stress, in the laminations. Treating FIG. 2 as a free body diagram, there is a centrifugal force 64 acting on the illustrated half of the lamination that is proportional to the mass and to the square of the rotational velocity. Force 64 is counteracted by the hoop stress 66. The hoop stress does not act at a single radial position but is instead distributed across each radial line from the inner periphery 62 to the outer periphery. The stress tends to be highest at radial positions that do not include holes, including magnet holes 52, cooling holes 56, and lightening holes 58. In the design illustrated in FIG. 2, that places the highest hoop stresses near inner periphery 62. Sharp internal corners tend to concentrate the load causing stress concentrations. FIG. 3 illustrates the key 60 in more detail. Note that the a radial fillet 68 on each side of key 60 provides a radiused corner to reduce the degree of stress concentration. Stress analysis of the design illustrated in FIGS. 2-3 indicate that the peak stress near this fillet limits the maximum allowable rotor speed.

Figure 4:
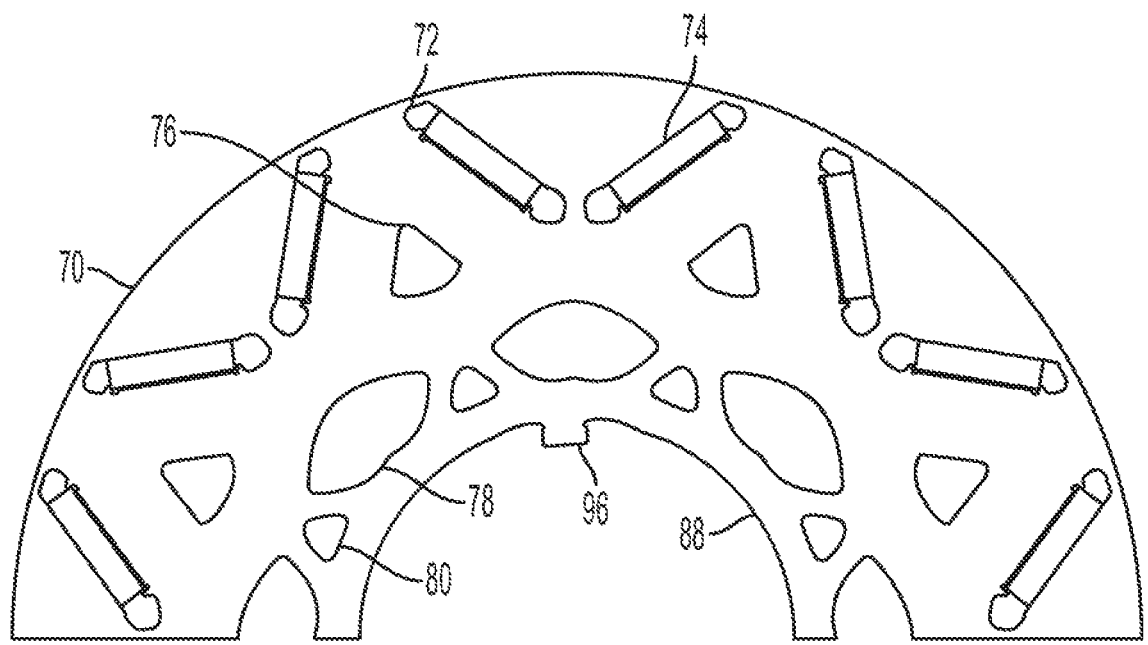
FIG. 4 is a partial cross section of a second motor rotor lamination.
Figure 5:
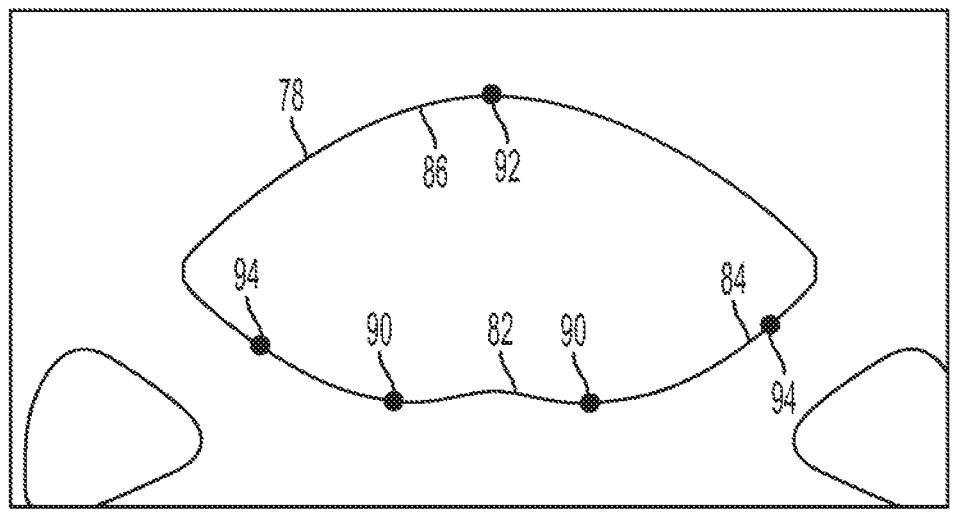
FIG. 5 is a detail view of one of the lightening holes of the motor rotor lamination of FIG. 4.

FIG. 4 illustrates half of a second rotor lamination design 70. Like the rotor lamination 50, there are a magnet holes 72 arranged in a plurality of V-shaped groups and containing permanent magnets 74. Also like lamination 50, there are cooling holes 76 between the V-shaped groups. The pattern of lightening holes differs from lamination 50. A plurality of large lightening holes 78 alternates circumferentially with a plurality of small lightening holes 80. The shape of the large lightening holes 78 is illustrated in more detail in FIG. 5. Each large lightening hole 78 is bounded by an inner edge 82, two side edges 84, and an outer edge 86. Inner edge 82 is substantially parallel to the inner periphery 88 of the lamination. The side edges 84 are at an oblique angle to the inner edge 82. An oblique angle is larger than 90 degrees and less than 180 degrees. The inner edge 82 includes the point(s) 90 of the hole that is (are) closest to the center of the lamination. The outer edge 86 includes the point(s) 92 of the hole that is (are) farthest from the center of the lamination. The side edges each contain a point 94 whose distance from the center of the lamination is halfway between the distance to point 90 and the distance to point 92. Each large lightening hole is centered under a corresponding V-shaped group of magnet holes. The small lightening holes 80 have smaller radius fillets than the fillets between inner edge 82 and side edges 84.

Figure 6:
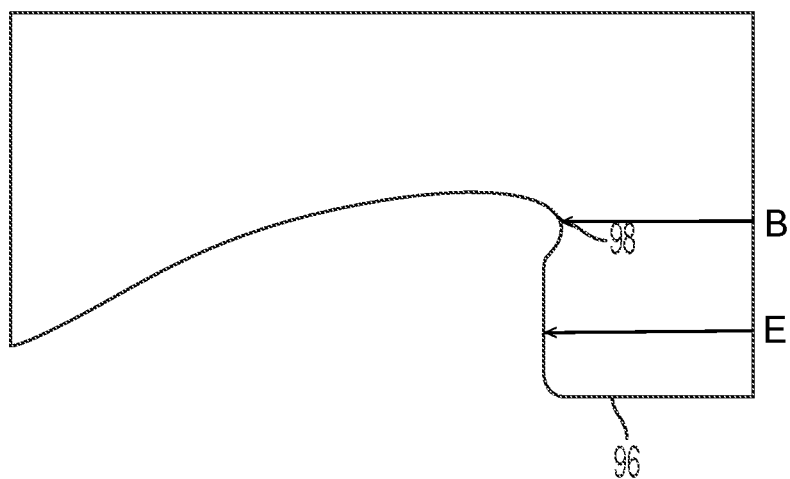
FIG. 6 is a detail view of the key of the motor rotor lamination of FIG. 4.

A key 96 is radially aligned with the inner edge of one of the large lightening holes. In other words, a radial line from the center of the lamination through the center of the key intersects the inner edge. Key 96 may be slightly offset from the center of the inner edge such that the magnets of some layers are slightly offset from the magnets of other layers to reduce torque ripple. The key geometry is illustrated in more detail in FIG. 6. Note that, unlike radial fillet 68 of FIG. 3, tangential fillet 98 (i) penetrates circumferentially into base, B, of key 96 resulting in end, E, of key 96 being wider than the base, and (ii) has a non-constant radius as apparent from FIG. 6.

The inventors have discovered that the tangential fillet and the lightening hole geometry reduce the hoop stress for a given rotor speed. Consequently, the maximum permissible speed may be increased without permanent deformation. Furthermore, the inventors believe that these features act synergistically to reduce hoop stress more in combination that in isolation. Specifically, the stress concentration associated with the key is separated circumferentially from the stress concentrations associated with the relatively small radius fillets of the small lightening holes.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A permanent magnet motor comprising:
    a plurality of rotor laminations, each rotor lamination defining a plurality of magnet holes, a first plurality of ovaloid-shaped lightening holes, and a key extending from an inner periphery of the rotor lamination and having tangential fillets at a base thereof outside a diameter of the inner periphery such that an end of the key is wider than the base; and
    a plurality of permanent magnets inserted into the magnet holes.

2. The permanent magnet motor of claim 1 wherein the key is radially aligned with an inner edge of one of the first plurality of lightening holes.

3. The permanent magnet motor of claim 2 wherein the key is offset from a center of the inner edge of the one of the first plurality of lightening holes.

4. The permanent magnet motor of claim 2 wherein each rotor lamination further defines a second plurality of lightening holes interspersed with the first plurality of lightening holes and smaller in area than the first plurality of lightening holes.

5. The permanent magnet motor of claim 2 wherein the magnet holes are grouped into a plurality of groups, each group corresponding to a rotor pole, and each group radially aligned with a corresponding lightening hole of the first plurality of lightening holes.

6. The permanent magnet motor of claim 5 wherein the laminations further define a plurality of cooling holes interspersed with the groups of magnet holes.

7. A rotor comprising:
    a plurality of rotor laminations, each rotor lamination defining a plurality of magnet holes, a first plurality of lightening holes, and a key extending from an inner periphery of the rotor lamination and having non-constant radius tangential fillets outside a diameter of the inner periphery such that an end of the key is wider than a base of the key; and a plurality of permanent magnets inserted into the magnet holes.

8. The rotor of claim 7 wherein the key is radially aligned with an inner edge of one of the first plurality of lightening holes.

9. The rotor of claim 8 wherein the key is offset from a center of the inner edge of the one of the first plurality of lightening holes.

10. The rotor of claim 7 wherein each rotor lamination further defines a second plurality of lightening holes interspersed with the first plurality of lightening holes and smaller in area than the first plurality of lightening holes.

11. The rotor of claim 7 wherein the magnet holes are grouped into a plurality of groups, each group corresponding to a rotor pole, and each group radially aligned with a corresponding lightening hole of the first plurality of lightening holes.

12. The rotor of claim 11 wherein the laminations further define a plurality of cooling holes interspersed with the groups of magnet holes.

13. A permanent magnet rotor lamination comprising:
a body defining a plurality of magnet holes, a first plurality of lightening holes, a key extending from an inner periphery of the rotor lamination and having tangential fillets at a base thereof outside a diameter of the inner periphery such that an end of the key is wider than the base, and a second plurality of lightening holes interspersed with the first plurality of lightening holes; and a key radially aligned with one of the first plurality of lightening holes.

14. The permanent magnet rotor lamination of claim 13 wherein the key is offset from a center of the inner edge of the one of the first plurality of lightening holes.

15. The permanent magnet rotor lamination of claim 13 wherein the second plurality of lightening holes are smaller in area than the first plurality of lightening holes.

16. The permanent magnet rotor lamination of claim 13 wherein the magnet holes are grouped into a plurality of groups, each group corresponding to a rotor pole, and each group is radially aligned with a corresponding lightening hole of the first plurality of lightening holes.

17. The permanent magnet rotor lamination of claim 16 wherein the laminations further define a plurality of cooling holes interspersed with the groups of magnet holes.

* * * * *